(12) United States Patent
Mimura

(10) Patent No.: US 8,364,352 B2
(45) Date of Patent: Jan. 29, 2013

(54) MONITOR POSITION ADJUSTMENT DEVICE

(75) Inventor: Yoshitaka Mimura, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 535 days.

(21) Appl. No.: 12/575,295

(22) Filed: Oct. 7, 2009

(65) Prior Publication Data
US 2010/0087951 A1 Apr. 8, 2010

(30) Foreign Application Priority Data
Oct. 8, 2008 (JP) ................ P2008-262033

(51) Int. Cl.
*B60R 22/00* (2006.01)

(52) U.S. Cl. ............ 701/49; 348/148; 348/837; 701/1; 701/29.6; 701/36

(58) Field of Classification Search .......... 340/461; 348/837, 148; 701/32.3, 49, 1, 36; 700/213
See application file for complete search history.

(56) References Cited

U.S. PATENT DOCUMENTS 6,064,932 A * 5/2000 François .................. 701/49
6,304,173 B2 * 10/2001 Pala et al. ................ 340/461
6,795,757 B2 * 9/2004 Sadahiro ................. 701/32.3
7,006,129 B1 * 2/2006 McClure ................. 348/148
2009/0316057 A1 * 12/2009 Campbell et al. ........ 348/837

FOREIGN PATENT DOCUMENTS

| JP | 2004-082835 A | 3/2004 |
| JP | 2005-075184 A | 3/2005 |
| JP | 2008-100622 A | 5/2008 |

* cited by examiner

*Primary Examiner* — Sath V Perungavoor
*Assistant Examiner* — Nathnael Aynalem
(74) *Attorney, Agent, or Firm* — Arent Fox LLP

(57) ABSTRACT

A monitor position adjustment device comprises: a backseat monitor which is provided at a backward position of a front seat in a vehicle such that an angle of a screen thereof is electrically adjusted toward a backseat; an angle detection unit configured to detect the angle of the backseat monitor; an operation input unit which is provided at a position where an operation by an operator on the front seat can be performed, and on which the angle of the backseat monitor after screen change can be input; a front seat display which is provided in front of the front seat and includes a screen toward the front seat; and a processing unit configured to perform display control of the front seat display based on a detection result of the angle detection unit, wherein the processing unit controls the front seat display to display current angle information of the backseat monitor.

11 Claims, 7 Drawing Sheets

ID ADJUSTMENT
MONITOR POSITION ADJUSTMENT DEVICE

BACKGROUND

1. Field of the Invention

The present invention relates to a monitor position adjustment device.

Priority is claimed on Japanese Patent Application No. 2008-262033, filed on Oct. 8, 2008, the contents of which are incorporated herein by reference.

2. Description of Related Art

A backseat monitor is known which is swingably attached to the roof of a vehicle, such as an automobile or the like, so as to be viewed from the backseat. In recent years, a monitor position adjustment device has been used which enables a passenger (operator, or driver) on a front seat to remotely operate the direction and angle of the backseat monitor (for example, see Japanese Unexamined Patent Application Publication No. 2005-075184).

In this monitor position adjustment device, an operating unit for adjusting the angle of the backseat monitor is disposed on the front seat side, and the backseat monitor whose angle is changed by the input of the operating unit is disposed at the back of the front seat. For this reason, when adjusting the angle of the backseat monitor, the passenger on the front seat needs to operate the operating unit while facing backward to confirm the angle of the backseat monitor, which makes angle adjustment complicated.

SUMMARY

A purpose of some aspects of the present invention is to provide a monitor position adjustment device which enables a passenger on a front seat to easily adjust the angle of a backseat monitor provided at the back of the front seat.

A first aspect of the invention provides a monitor position adjustment device. The monitor position adjustment device includes: a backseat monitor which is provided at a backward position from a front seat in a vehicle such that an angle of a screen thereof is electrically adjusted toward a backseat; an angle detection unit configured to detect the angle of the backseat monitor; an operation input unit which is provided at a position where an operation by an operator on the front seat can be performed, and on which the angle of the backseat monitor after screen change can be input; a front seat display which is provided in front of the front seat and includes a screen toward the front seat; and a processing unit configured to perform display control of the front seat display based on a detection result of the angle detection unit, wherein the processing unit controls the front seat display to display current angle information of the backseat monitor.

In the monitor position adjustment device, the processing unit can control the front seat display to display angle information of the backseat monitor after change based on an input result of the operation input unit.

In the monitor position adjustment device, the display current angle information of the backseat monitor, which is described with an inner cursor, and the angle information of the backseat monitor after change, which is described with an outer frame cursor, can be displayed with indicators.

In the monitor position adjustment device, the processing unit can control the front seat display to display range information, which indicates a visible range of the backseat monitor after change.

In the monitor position adjustment device, the processing unit can control the front seat display to display backseat passenger indication.

In the monitor position adjustment device, the operation input unit can be configured to input a sitting condition of the passenger on the backseat and changes the passenger indication on the front seat display based on the input sitting condition.

The monitor position adjustment device can further include a passenger detection unit configured to detect a passenger on the backseat, wherein the passenger indication on the front seat display is changed based on an output result of the passenger detection unit.

The monitor position adjustment device can further include an abnormality processing unit configured to halt the operation to change the angle of the backseat monitor when an operation to change the angle of the backseat monitor is made by the operation input unit, if the current angle does not become the angle after change even though a predetermined time has elapsed.

In the monitor position adjustment device, the abnormality processing unit can be configured to halt a first angle change of the backseat monitor and to execute a second angle change of the backseat monitor in a direction opposite to an operation input for the first angle change.

In the monitor position adjustment device, the abnormality processing unit can be configured to limit an operation input related to angle change of the backseat monitor.

The monitor position adjustment device can further include an abnormality processing unit configured to display an abnormality indication on the front seat display when an operation to change the angle of the backseat monitor is made by the operation input unit, if the current angle does not become the angle after change even though a predetermined time has elapsed.

According to some aspects of the invention, angle adjustment can be easily performed, as compared with the related art where the operator on the front seat remotely operates the angle of the backseat monitor while facing backward to confirm the angle of the backseat monitor.

DESCRIPTION OF EMBODIMENTS

A monitor position adjustment device according to an embodiment of the invention will be described with reference to the drawings. In this embodiment, a description will be given as an example where a vehicle is a so-called three-row seat type vehicle having two rows of backseats.

Figure 1:
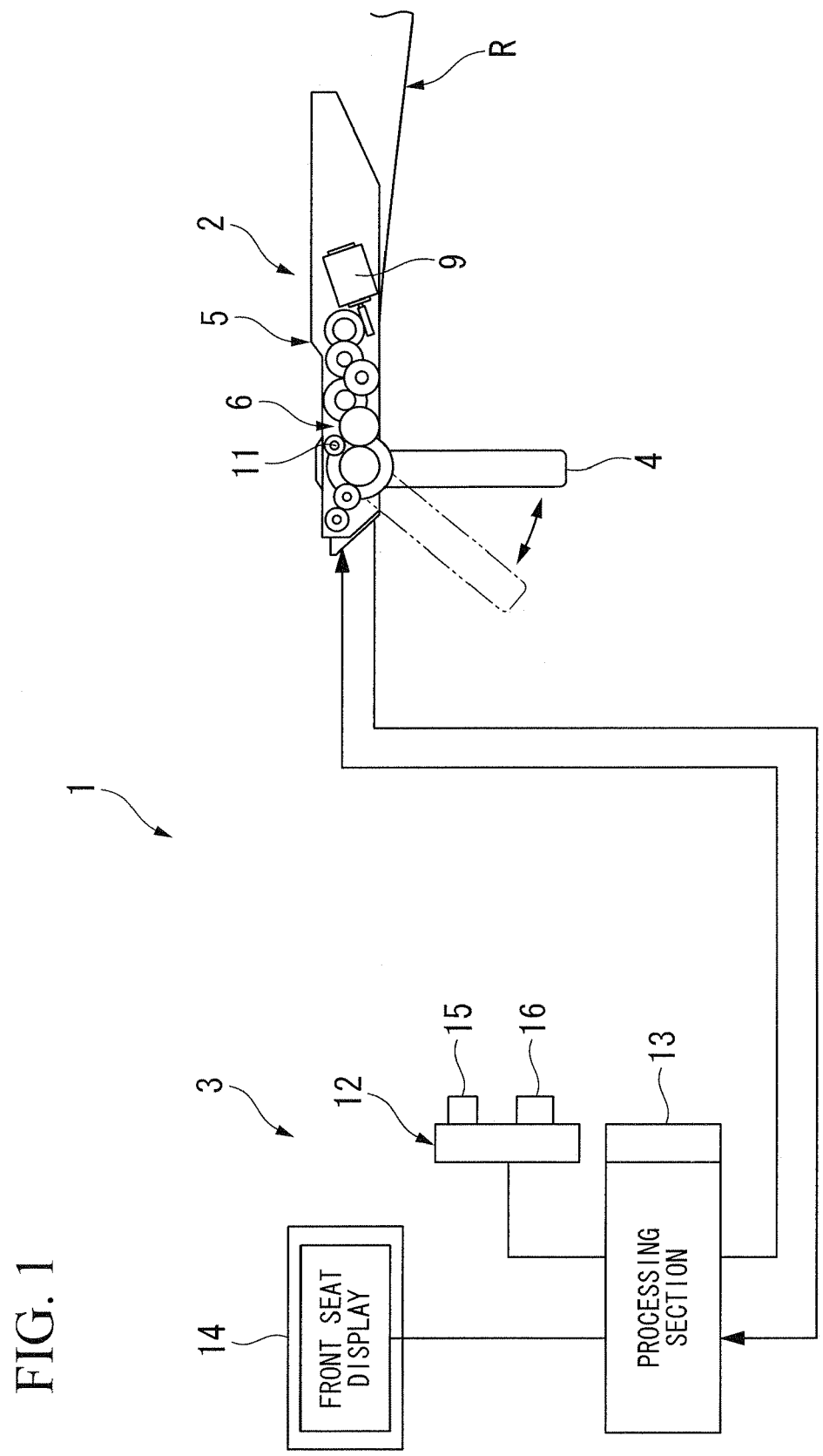
FIG. 1 is a diagram showing the overall configuration of a monitor position adjustment device according to an embodiment of the invention.
Figure 2:
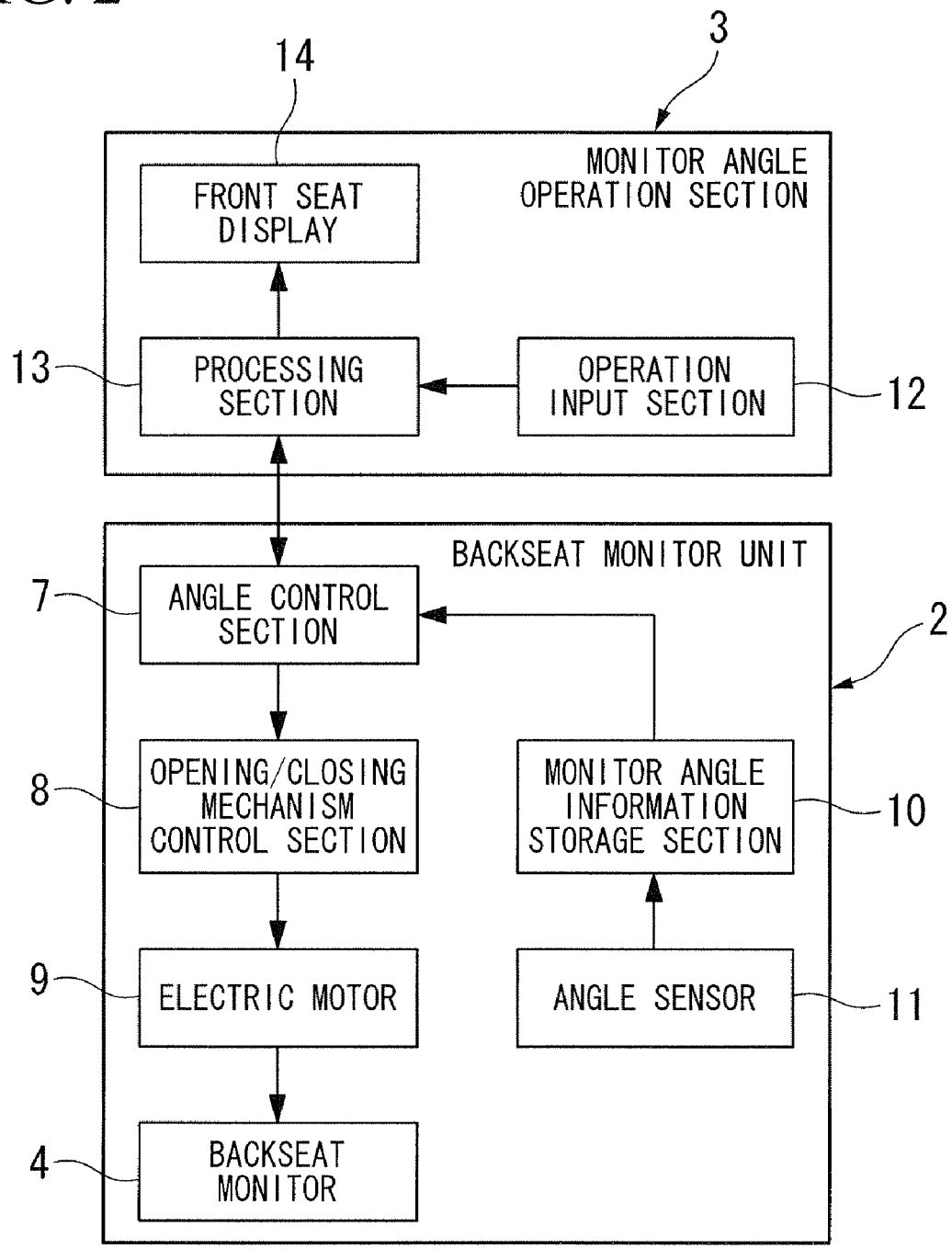
FIG. 2 is a block diagram showing the overview of the monitor position adjustment device according to the embodiment of the invention.

FIGS. 1 and 2 show the overall configuration of a monitor position adjustment device 1 of this embodiment. The monitor position adjustment device 1 mainly includes a backseat monitor unit 2 and a monitor angle operation section 3.

The backseat monitor unit 2 includes a unit main body 5 which is attached to the roof R of the vehicle, and a backseat monitor 4, such as an LCD or the like, which displays various kinds of image data output from an image processor (not shown). The backseat monitor unit 2 also includes an angle control section 7, an opening/closing mechanism control section 8, an electric motor 9, a monitor angle information storage section 10, and an angle sensor 11.

The backseat monitor 4 is disposed at a position where passengers on the second and third seats, which are backseats, can view the backseat monitor 4, specifically, a slightly backward position from the front seat. The upper end portion of the backseat monitor 4 is connected to a rotation mechanism 6 of the unit main body 5 so as to be rotatable in the left-right axis direction and the up-down axis direction of the vehicle. The backseat monitor 4 is changed at a predetermined rotation angle in accordance with a control command (angle information) from the monitor angle operation section 3.

The angle control section 7 sets and controls the rotation angle of the backseat monitor 4 on the basis of an output signal (angle change information) of the monitor angle operation section 3 and an output signal (current angle information) of the monitor angle information storage section 10. For example, the angle control section 7 calculates, for example, a change angle or direction with respect to the current angle, and outputs a corresponding control signal to the opening/closing mechanism control section 8. The angle control section 7 also outputs angle information of the backseat monitor 4, which is input from the monitor angle information storage section 10, to the processing section 13 of the monitor angle operation section 3.

The opening/closing mechanism control section 8 brings the electric motor 9 into electric conduction on the basis of the control signal output from the angle control section 7.

The electric motor 9 is configured such that a drive shaft thereof is connected to the upper end portion of the backseat monitor 4 through a plurality of gears of the rotation mechanism 6. The electric motor 9 is brought into electric conduction by the opening/closing mechanism control section 8.

The angle sensor 11 is a sensor which is attached to the upper end portion of the backseat monitor 4 in the left-right axis direction of the vehicle so as to detect the current angle of the backseat monitor 4. The detection result of the angle sensor 11 is transmitted to the monitor angle information storage section 10.

The monitor angle information storage section 10 stores the current angle of the backseat monitor 4 on the basis of angle information from the angle sensor 11. Information stored in the monitor angle information storage section 10 is output to the angle control section 7 in accordance with a request from the angle control section 7.

That is, while the angle control section 7 performs feedback control on the electric motor 9, the opening/closing mechanism control section 8 controls the driving of the electric motor 9, so the backseat monitor 4 can be changed at a predetermined angle. The backseat monitor 4 is held in a closed state substantially parallel to the roof panel of the vehicle when unused, and is in an open state shown in FIG. 1 only when being used.

The monitor angle operation section 3 includes an operation input section 12, a processing section 13, and a front seat display 14.

The operation input section 12 includes an opening/closing operation switch 15 and an angle operation switch 16. The operation input section 12 is disposed in the instrument panel or steering wheel of the vehicle. The opening/closing operation switch 15 is a switch, such as a push button or the like, which can be switched on/off. The opening/closing operation switch 15 is used when the operator (driver or passenger) on the front seat makes an operation input to open/close the backseat monitor 4 of the backseat monitor unit 2, and outputs the operation input result to the processing section 13.

The angle operation switch 16 is a rotary switch with a click feeling, and outputs the operation input result of a rotation amount (the number of clicks) to the processing section 13. The backseat monitor 4 is tilted forward and backward of the vehicle in accordance with the rotation amount and rotation direction of the angle operation switch 16. In this embodiment, for example, when the backseat monitor 4 is tilted backward of the vehicle, the angle operation switch 16 is rotated in the clockwise direction, and when the backseat monitor 4 is tilted forward of the vehicle, the angle operation switch 16 is rotated in the counterclockwise direction.

Figure 4:
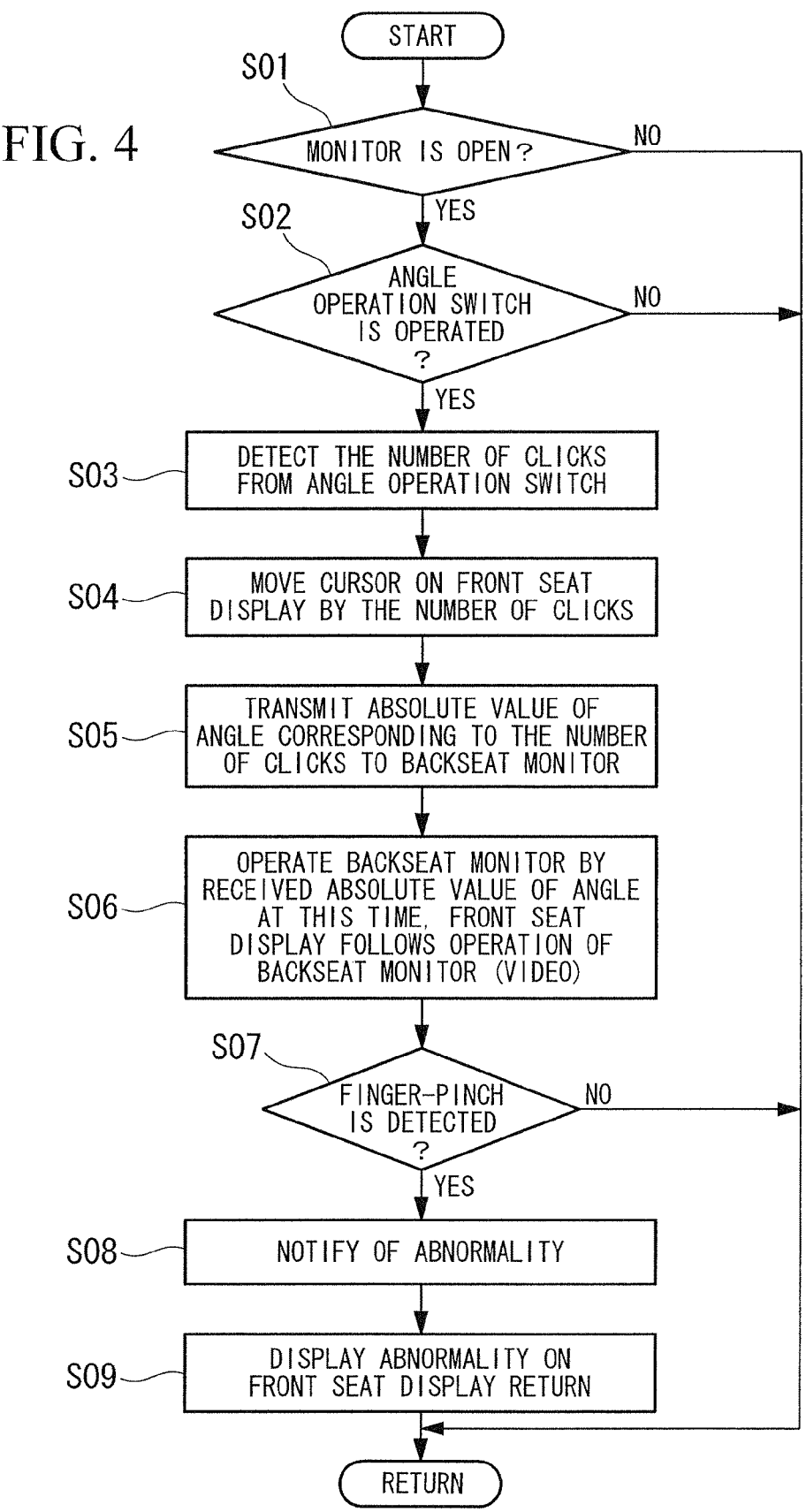
FIG. 4 is a flowchart of an angle adjustment process according to the embodiment of the invention.

The front seat display 14 is a display, such as an LCD (Liquid Crystal Display), in which display control is performed by the processing section 13, and is provided at a location where the driver on the front seat of the vehicle can easily view the front seat display 14. The front seat display 14 is configured such that the details of the angle state of the backseat monitor 4 are displayed on an angle adjustment screen 20 (see FIG. 4) described below. With regard to the front seat display 14, for example, an information display may be used which is disposed in the instrument panel in front of the driver so as to display various kinds of information.

The processing section 13 outputs opening operation information or closing operation information according to the operation situation of the opening/closing operation switch 15 to the angle control section 7 on the basis of an operation input of the operation input section 12. When the angle operation switch 16 is rotated, absolute value information (described below) of the angle according to the rotation amount (the number of clicks) and rotation direction of the angle operation switch 16 is output to the angle control section 7. The processing section 13 performs the display control of the angle adjustment screen 20 of the front seat display 14 on the basis of the absolute value information of the angle.

Figure 3:
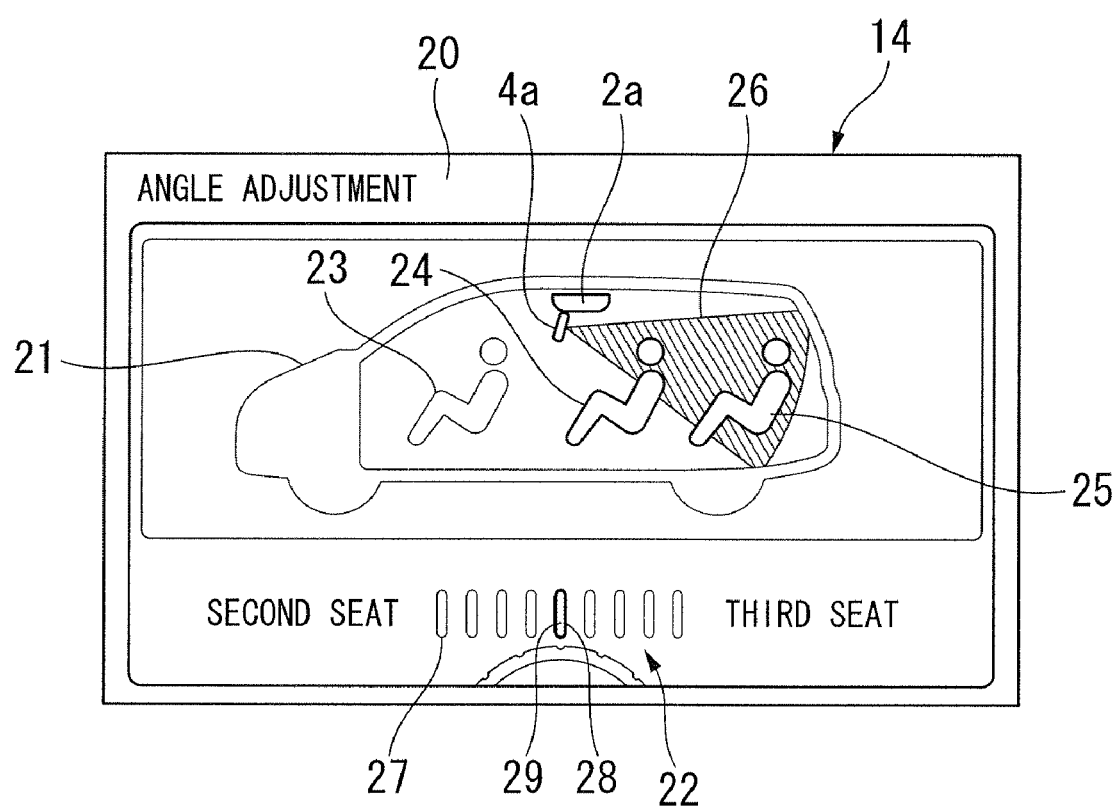
FIG. 3 is a diagram showing an example of an angle adjustment screen according to the embodiment of the invention.

FIG. 3 shows a display example of the angle adjustment screen 20. On the angle adjustment screen 20, a vehicle 21 schematically illustrated is displayed to be pointed to the left, and an angle indicator 22 of the backseat monitor 4 is displayed at the lower portion of the screen. The vehicle 21 is a three-row seat type vehicle, and in the vehicle 21, passenger indications (passenger displays) 23 to 25 of the passengers who are sitting are respectively displayed at the positions of a front seat, and a second-row seat (second seat) and a third-row seat (third seat), which are backseats.

At the front portion of the vehicle between the passenger indication 23 of the front seat and the passenger indication 24 of the second-row seat of the vehicle 21, a backseat monitor unit 2*a* which schematically illustrates the backseat monitor 2 is displayed. A backseat monitor 4a is displayed so as to protrude downward from the backseat monitor unit 2a. The angle of the backseat monitor 4a is displayed at a position according to an operation input.

In the interior of the vehicle 21, a fan-shaped region 26 (in FIG. 3, a hatched region) which has a center line intersecting perpendicularly to the screen of the backseat monitor 4a is displayed at the back of the backseat monitor 4a. The region 26 represents a region where the passenger on the backseat can easily view the backseat monitor 4a, and is changed depending on the angle of the backseat monitor 4a.

The angle indicator 22 displays the current angle and a desired angle to be changed of the backseat monitor 4, and has a predetermined number of display windows 27 (in FIG. 3, 9 display windows) arranged in series. The display windows 27 are obtained by equally dividing the rotatable angle of the backseat monitor 4.

Each of the display windows 27 is configured such that the outer frame thereof can be turned on by an outer frame cursor 28, and the inside thereof can be turned on by an inner cursor 29 having a different color from the outer frame cursor 28.

The outer frame cursor 28 is displayed in a display window 27 which corresponds to a desired angle selected by the angle operation switch 16, and the inner cursor 29 is displayed in a display window 27 which corresponds to the current angle of the backseat monitor 4. The angle indicator 22 of FIG. 3 shows a case where the current angle and the desired angle are in the initial state, and the turn-on positions of the current angle and the desired angle are both on the display window 27 at the center of the angle indicator 22. In this case, the outer frame cursor 28 and the inner cursor 29 are displayed in the same display window 27.

FIG. 3 shows an example where one end (in FIG. 3, the left side) of the angle indicator 22 having the display windows 27 arranged in series represents the orientation facing the passenger of the second-row seat, and the other end (in FIG. 3, the right side) represents the orientation facing the passenger of the third-row seat. The orientation facing the passenger on the second-row seat refers to a direction where the end of the region 26 is moved further upward, and the orientation facing the passenger on the third-row seat refers to a direction where the end of the region 26 is moved further downward. Accordingly, if a passenger rotates the angle operation switch 16, the position of the display window 27 of the angle indicator 22 with its outer frame being turned on is changed by the number of clicks, and the angle of the region 26 is changed in accordance with a desired angle selected by the angle operation switch 16. The operation to change the angle of the backseat monitor 4 is slower than the operation speed of the desired angle, so display of the current angle by turning-on of the inside of the display window 27 is changed so as to be slower than the change of the desired angle (for example, see FIG. 6).

The monitor position adjustment device 1 of this embodiment includes the above-described configuration. Next, the operation of the monitor position adjustment device 1 will be described with reference to a flowchart of FIG. 4.

First, in Step S01, it is determined whether or not the backseat monitor 4 is in the open state (the monitor is open).

When it is determined to be "No" (the monitor is closed) in Step S01, execution of this routine temporarily ends.

When it is determined to be "Yes" (the monitor is open) Step S01, the process progresses to Step S02.

Figure 5:
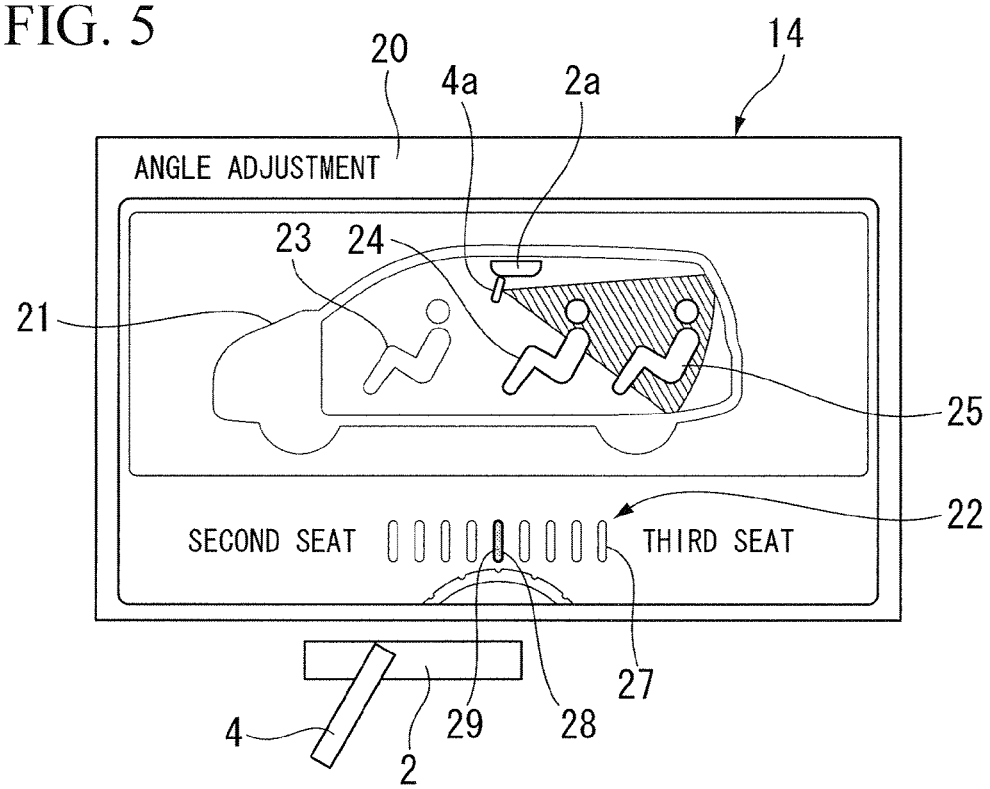
FIG. 5 is a diagram showing an example of an angle adjustment screen and a backseat monitor unit before angle adjustment.

The front seat display 14 is controlled by the processing section 13 and displays an angle adjustment screen 20 shown in FIG. 5. Below the angle adjustment screen 20 of FIG. 5, the state of the backseat monitor unit 2 which corresponds to the display content of the angle adjustment screen 20 is shown (the same is applied to FIGS. 6 and 7).

In Step S02, it is determined whether or not a passenger operates the angle operation switch 16.

When it is determined to be "No" (no operation is made) in Step S02, execution of this routine temporarily ends.

When it is determined to be "Yes" (an operation is made) in Step S02, the process progresses to Step S03, and the number of clicks of the angle operation switch 16 is detected.

Figure 6:
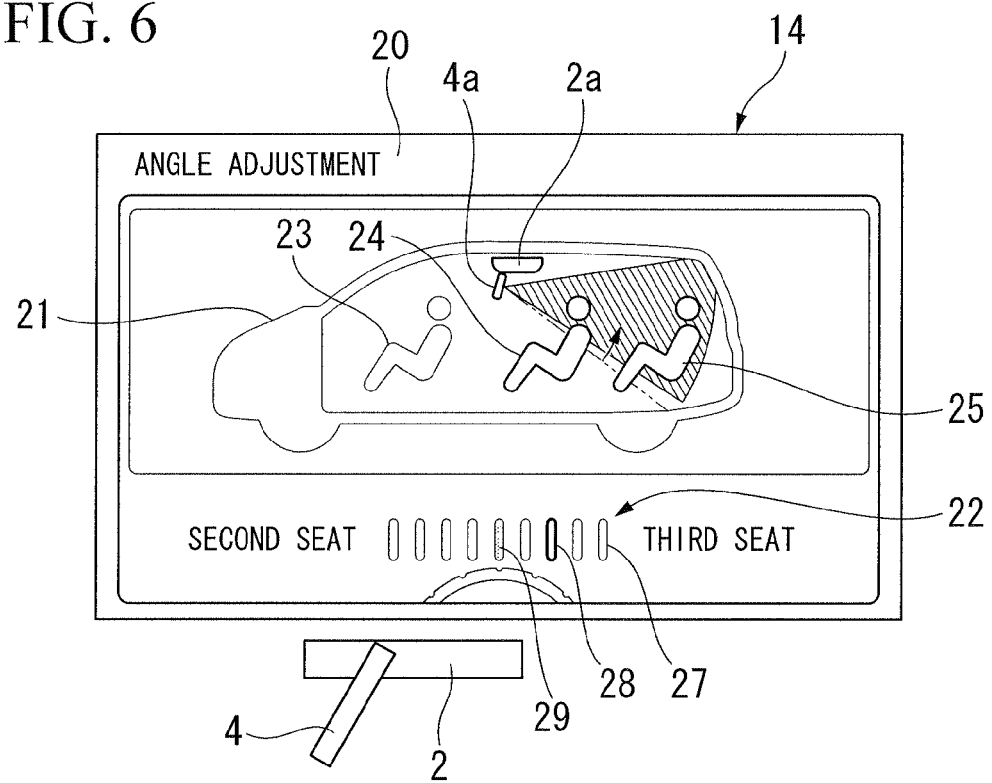
FIG. 6 is a diagram showing an example of an angle adjustment screen and a backseat monitor unit when an operation input of an angle operation switch is made.

Next, in Step S04, the processing section 13 moves the outer frame cursor 28 of the angle indicator 22 displayed on the angle adjustment screen 20 of the front seat display 14 by the number of clicks of the angle operation switch 16 (cursor movement) (see FIG. 6).

In Step S05, absolute value information of an angle corresponding to the number of clicks of the angle operation switch 16 is output (transmitted) to the backseat monitor unit 2. For example, it is assumed that one end of the rotation range of the backseat monitor 4 is set to 0°, and the other end of the rotation range is set to 90°. In this case, the angle indicator 22 of FIG. 3 has 9 display windows 27, and angle change is made in 9 steps, so if an operation input for two clicks is made with the angle operation switch 16, the absolute value information of the angle becomes "20°".

Figure 7:
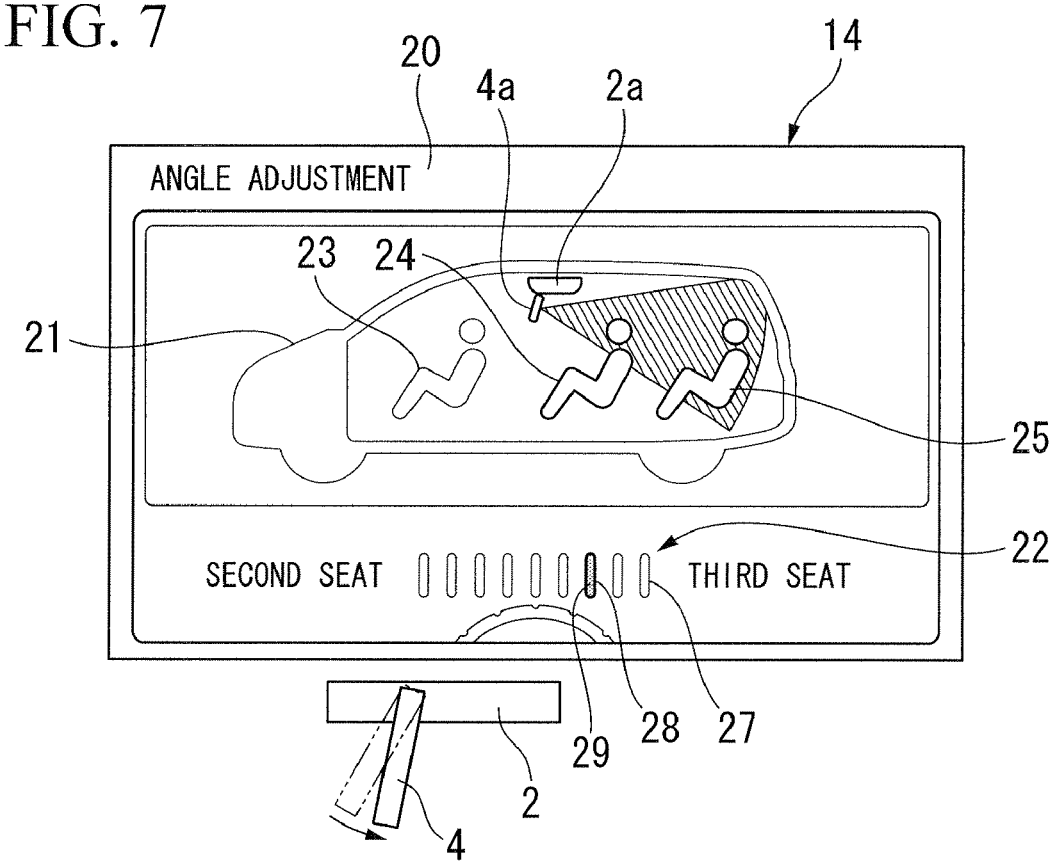
FIG. 7 is a diagram showing an example of an angle adjustment screen and a backseat monitor unit when an operation input of an angle operation switch is made after the angle adjustment of a backseat monitor.

In Step S06, the backseat monitor 4 is operated on the basis of the absolute value information of the angle input to the backseat monitor unit 2. At this time, current angle information is output from the angle control section 7 to the processing section 13, and as shown in FIG. 7, the position of the inner cursor 29 for displaying the current angle in the angle indicator 22 of the angle adjustment screen 20 (monitor) displayed on the front seat display 14 is changed in accordance with the operation of the backseat monitor 4. Then, the angle of the backseat monitor 4a and the angle of the region 26 of the angle adjustment screen 20 are changed simultaneously with the change of the inner cursor 29.

In Step S07, it is determined whether or not an abnormality, such as finger pinching or the like, is detected. The abnormality detection is performed by comparing the current angle of the backseat monitor 4 with a desired angle and determining whether the current angle and the desired angle are identical or not when a predetermined time has elapsed. When the current angle and the desired angle are not identical even though the predetermined time has elapsed, it is estimated that an obstacle, such as a finger or the like, is pinched, and the operation of the backseat monitor 4 is obstructed. This obstruction is detected as an abnormality.

When it is determined to be "No" (no abnormality is detected) in Step S07, execution of this routine temporarily ends.

When it is determined to be "Yes" (abnormality is detected) in Step S07, the process progresses to Step S08, and the abnormality is notified to the processing section 13. Then, the process progresses to Step S09.

Figure 8:
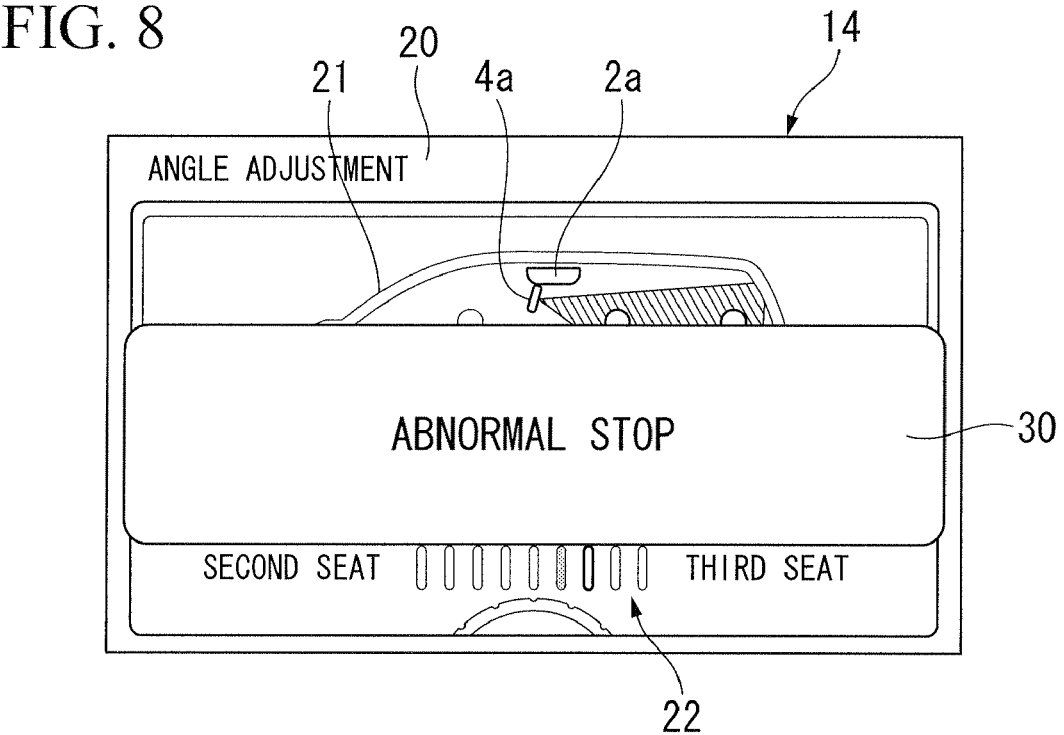
FIG. 8 is a diagram showing an angle adjustment screen when an abnormality is determined.

In Step S09, an abnormality display 30 is displayed on the front seat display 14 (see FIG. 8), and the execution of this routine temporarily ends. When the abnormality display 30 is displayed, even if the abnormal state is resolved immediately thereafter, an operation input related to angle change may be limited and disablement may be continued. Accordingly, the same abnormality can be prevented from occurring again. In addition, during the abnormality notification, the backseat monitor 4 may be tilted in a direction opposite to the direction of angle change of the backseat monitor 4 immediately before the abnormality is detected, as an attempt to resolve the abnormal state, especially, the pinching state.

Therefore, according to the monitor position adjustment device 1 of the above-described embodiment, for example, when a passenger walks through the vehicle and comes into contact with the backseat monitor 4, and the angle of the backseat monitor 4 is shifted, or when the orientation of the backseat monitor 4 for the sitting condition of the passenger is not suitable, the operator on the front seat can adjust the angle position of the backseat monitor 4 to the optimum position by the angle operation switch 16 while viewing the current angle of the backseat monitor 4, the desired angle after change, the angle position of the backseat monitor 4 corresponding to the desired angle, and the seat positions of the vehicle 21, that is, the arrangement of the passenger indications 24 and 25 on the front seat display. Therefore, angle adjustment can be easily performed, as compared with a case where the operator on the front seat remotely operates the angle of the backseat monitor 4 while facing backward to confirm the angle of the backseat monitor 4.

When the current angle of the backseat monitor 4 does not become the desired angle even though a predetermined time has elapsed after the operation to change the angle of the backseat monitor 4 is made, it is determined that the abnormal state is reached due to pinching of an obstacle, such as a finger or the like, during the angle change of the backseat monitor 4, and the angle change of the backseat monitor 4 stops. Then, the angle of the backseat monitor 4 is changed in a direction opposite to the direction of angle change by the operation input. Therefore, when an abnormality is produced due to pinching, the abnormal state can be resolved.

When the abnormal state is detected, the abnormality display 30 is displayed on the front seat display 14, such that an abnormality, such as pinching or the like, can be notified to the operator on the front seat, and, for example, an operation input related to angle change can be limited and disabled. Therefore, an abnormality, such as pinching or the like, can be prevented from occurring again due to the same angle change operation being immediately performed.

The invention is not limited to the monitor position adjustment device 1 of the above-described embodiment. Another embodiment may be configured such that the operation input section 12 is provided with input keys (not shown) which are operated by the operator on the front seat to input the conditions of passengers on the backseats (the backseat sitting conditions), such as the backseat position or angle, the passenger's sitting position, the passenger's sitting height, and the like, and the passenger indications 24 and 25 on the angle adjustment screen 20 are changed to the display contents corresponding to the sitting condition on the basis of the backseat sitting condition input through the input keys.

Figure 9:
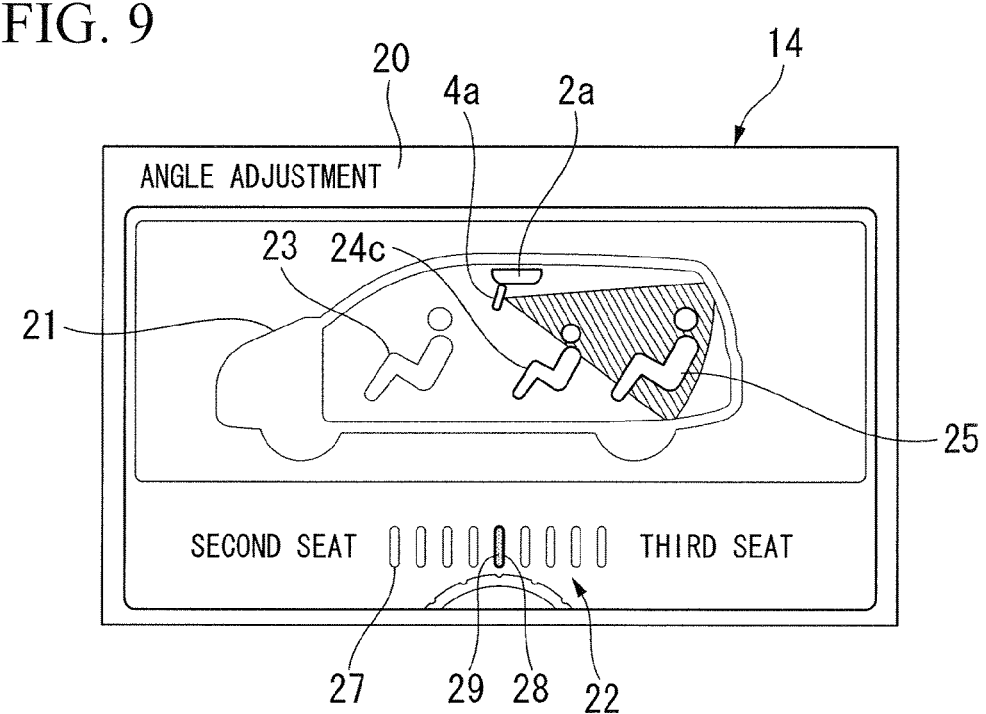
FIG. 9 is a diagram corresponding to FIG. 3 according to another embodiment of the invention.

For example, when the sitting conditions are input such that a child is sitting on the second-row seat, and an adult is sitting on the third-row seat, as shown in FIG. 9, the passenger indication 24C for a child which is smaller than the passenger indication 25 on the third-row seat is displayed on the second-row seat. A sitting height may be input, instead of an adult and child, such that passenger indication (not shown) may be performed at a height according to the passenger's sitting height.

Figure 10:
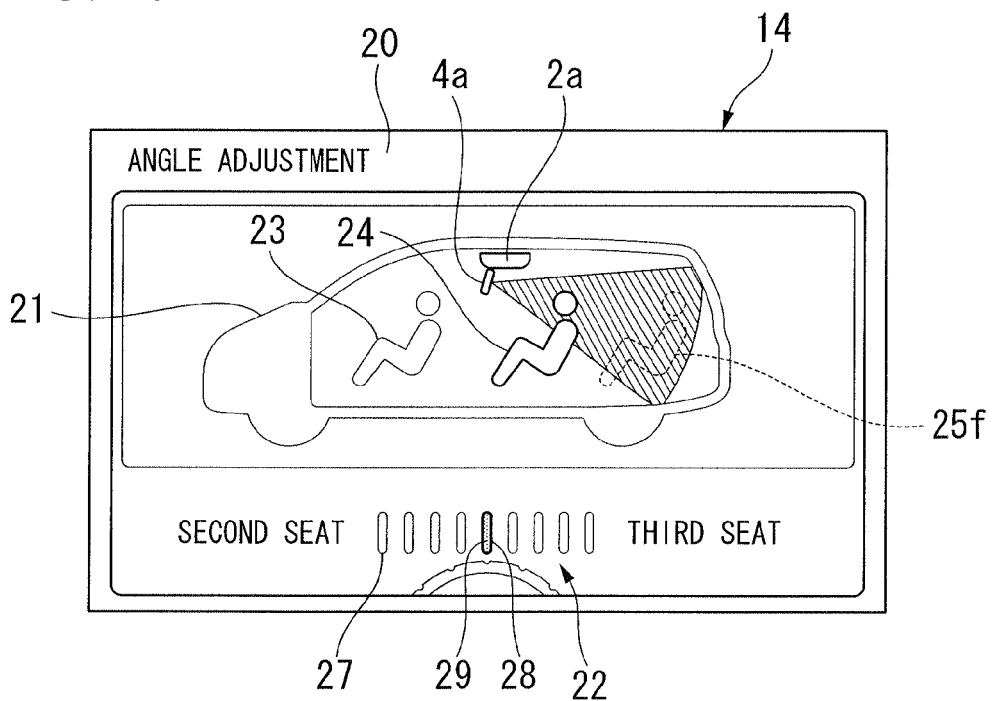
FIG. 10 is a diagram corresponding to FIG. 3 according to yet another embodiment of the invention.

Yet another embodiment may be configured such that, when there is a seat on which no passenger is sitting, the passenger indication 24 or 25 of the relevant seat may be changed such that no passenger is sitting on the seat can be recognized FIG. 10 shows an angle adjustment screen 20 when a passenger is sitting on the second-row seat and no passenger is sitting on the third-row seat. No-passenger indication 25*f* is displayed in which the outline of the passenger indication on the third-row seat is drawn by a dotted line. The passenger indication 24 or 25 of the seat position on which no passenger is sitting may be displayed in a hollow manner.

Though not shown, the positions of passenger indications may be changed in the front-back direction of the vehicle 21 in accordance with the positions or angles of the second-row seat and the third-row seat.

Yet another embodiment may be configured such that the seat position or angle, the passenger's sitting position, the passenger's sitting height, and the like are input as the passenger sitting conditions, such that the operator on the front seat can recognize the angle position of the backseat monitor 4 corresponding to the input sitting conditions through the angle adjustment screen 20. Therefore, the angle of the backseat monitor 4 can be adjusted to the optimum angle.

Although in another embodiment, a case where the operator on the front seat inputs the sitting conditions has been described, a detection device, such as a sitting sensor or the like, may be provided to automatically detect the sitting conditions and to change the display contents on the angle adjustment screen 20. When the detection device is used to detect the sitting height of the passenger on the backseat, for example, the position of the head portion of the passenger on the backseat may be detected by face recognition using a photographing unit, such as a camera or the like, disposed toward the passenger on the backseat, and the position of the head portion (sitting height) of passenger indication on the angle adjustment screen 20 may be changed in accordance with the position of the head portion.

In the foregoing embodiments, although a case where a vehicle is a three-row seat type vehicle has been described, the monitor position adjustment device may be used as an angle adjustment device for a backseat monitor of a vehicle other than a three-row seat type vehicle.

According to some embodiments of the invention, for example, when a passenger or the like comes into contact with the backseat monitor and the angle of the backseat monitor is shifted, or when the orientation of the backseat monitor is not suitable for the sitting conditions of the passenger, the operator on the front seat can adjust the angle position of the backseat monitor to the optimum position by the operating unit while viewing the current angle of the backseat monitor, the angle after change, the position of the backseat monitor after change, and the seat position of the vehicle on the front seat display. Therefore, angle adjustment can be easily performed, as compared with the related art where the operator on the front seat remotely operates the angle of the backseat monitor while facing backward to confirm the angle of the backseat monitor.

According to some embodiments of the invention, for example, the seat position or angle, the passenger's sitting position, and the passenger's sitting height, and the like are input as the passenger sitting conditions, such that the angle position corresponding to the input sitting conditions, for example, the sitting conditions including the seat position or angle, the passenger's sitting position and sitting height, and the like, can be recognized. Therefore, the angle of the backseat monitor can be adjusted to the optimum angle.

According to some embodiments of the invention, when the current angle of the backseat monitor does not become the angle after change even though a predetermined time has elapsed after the operation to change the angle of the backseat monitor is made, it is determined that the backseat monitor has entered the abnormal state, such as pinching of an obstacle, and the angle change of the backseat monitor is stopped. Then, the angle of the backseat monitor is changed in a direction opposite to the direction of angle change by the operation input. Therefore, when abnormality is produced due to pinching, the abnormal state can be resolved.

At this time, an abnormality display is displayed on the front seat display, such that an abnormality, such as pinching or the like, can be notified to the operator on the front seat.

An operation input related to angle change is limited, such that the same abnormality, such as pinching or the like, can be prevented from being produced due to angle change.

According to some embodiments of the invention, for example, when the orientation of the backseat monitor is not suitable for the sitting conditions of the passenger, the operator on the front seat can adjust the angle position of the backseat monitor to the optimum position by the operating unit while viewing the position of the backseat monitor and the seat position of the vehicle after the angle change of the backseat monitor on the front seat display. Therefore, angle adjustment can be easily performed, as compared with the related art where the operator on the front seat remotely operates the angle of the backseat monitor while facing backward to confirm the angle of the backseat monitor.

According to some embodiments of the invention, passenger indication (passenger display) on the display can be changed on the basis of the output result of the passenger detection unit which detects the passenger on the backseat. Therefore, the operator on the front seat can adjust the angle of the backseat monitor to the optimum angle while viewing the passenger display.

While the embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A monitor and monitor position adjustment device comprising: a backseat monitor which is provided at a backward position from a front seat in a vehicle such that an angle of a screen thereof is selectively and electrically adjusted toward a backseat; an angle detection unit configured to detect the angle of the backseat monitor; an operation input unit which is provided at a position where an operation by an operator on the front seat can be performed, and by which the angle of the backseat monitor after screen change can be input; a front seat display which is provided in front of the front seat and includes a screen toward the front seat; and a processing unit configured to perform display control of the front seat display based on a detection result of the angle detection unit, wherein the processing unit controls the front seat display to display current angle information of the backseat monitor.

2. The monitor and monitor position adjustment device according to claim 1, wherein the processing unit controls the front seat display to display angle information of the backseat monitor after change based on an input result of the operation input unit.

3. The monitor and monitor position adjustment device according to claim 2, wherein the current angle information of the backseat monitor, and the angle information of the backseat monitor after change are displayed with different indicators adjacent to each other.

4. The monitor and monitor position adjustment device according to claim 1, wherein the processing unit controls the front seat display to display range information indicating a visible range of the backseat monitor after change.

5. The monitor and monitor position adjustment device according to claim 1, wherein the processing unit controls the front seat display to display backseat passenger indication.

6. The monitor and monitor position adjustment device according to claim 5, wherein the operation input unit is configured to input a sitting condition of the passenger on the backseat and changes the passenger indication on the front seat display based on the input sifting condition.

7. The monitor and monitor position adjustment device according to claim 5, further comprising a passenger detection unit configured to detect a passenger on the backseat, wherein the passenger indication on the front seat display is changed based on an output result of the passenger detection unit.

8. The monitor and monitor position adjustment device according to claim 1, further comprising an abnormality processing unit configured to halt the operation to change the angle of the backseat monitor when an operation to change the angle of the backseat monitor is made by the operation input unit, if the current angle does not become the angle after change even though a predetermined time has elapsed.

9. The monitor and monitor position adjustment device according to claim 8, wherein the abnormality processing unit is configured to halt a first angle change of the backseat monitor and to execute a second angle change of the backseat monitor in a direction opposite to an operation input for the first angle change.

10. The monitor and monitor position adjustment device according to claim 8, wherein the abnormality processing unit is configured to limit an operation input related to angle change of the backseat monitor.

11. The monitor and monitor position adjustment device according to claim 1, further comprising an abnormality processing unit configured to display an abnormality indication on the front seat display when an operation to change the angle of the backseat monitor is made by the operation input unit, if the current angle does not become the angle after change even though a predetermined time has elapsed.

* * * * *